(12) United States Patent
Jafari

(10) Patent No.: US 10,505,357 B1
(45) Date of Patent: Dec. 10, 2019

(54) RELEASABLE ELECTRICAL CONNECTOR

(71) Applicant: HAMPTON ELECTRIC, LLC, Carson, CA (US)

(72) Inventor: Afshin Jafari, Redondo Beach, CA (US)

(73) Assignee: Hampton Electric, LLC, Carson, CA (US)

( * ) Notice: Subject to any disclaimer, the term of this patent is extended or adjusted under 35 U.S.C. 154(b) by 0 days.

(21) Appl. No.: 16/224,559

(22) Filed: Dec. 18, 2018

(51) Int. Cl.
  *H02G 15/16* (2006.01)
  *H02G 15/117* (2006.01)
  *H02G 3/08* (2006.01)

(52) U.S. Cl.
  CPC .......... *H02G 15/16* (2013.01); *H02G 15/117* (2013.01); *H02G 3/083* (2013.01)

(58) Field of Classification Search
  CPC ...... H02G 15/16; H02G 15/117; H02G 3/083; H02G 3/0691; H02G 3/18; H02G 3/06; H01R 13/5816
  See application file for complete search history.

(56) References Cited

U.S. PATENT DOCUMENTS

| | | | |
|---|---|---|---|
| 6,114,630 A | 9/2000 | Gretz | |
| 6,194,661 B1 | 2/2001 | Gretz | |
| 6,444,907 B1 | 9/2002 | Kiely | |
| 6,670,553 B1 | 12/2003 | Gretz | |
| 6,682,355 B1 | 1/2004 | Gretz | |
| 7,148,431 B2 | 12/2006 | Pyron | |
| 7,358,448 B2 | 4/2008 | Auray et al. | |
| 7,390,979 B1 | 6/2008 | Johnson | |
| 7,476,817 B1 | 1/2009 | Shemtov | |
| 7,554,041 B2 | 6/2009 | Ducret | |
| 7,935,886 B2 | 5/2011 | Jafari | |
| 8,350,163 B2 | 1/2013 | Auray et al. | |
| 8,791,377 B2 | 7/2014 | Jafari | |
| 9,866,001 B2 | 1/2018 | Jafari et al. | |
| 2004/0177988 A1 | 9/2004 | Kiely | |
| 2008/0053680 A1* | 3/2008 | Kiely | ............ H02G 3/0683 174/70 R |
| 2010/0084854 A1 | 4/2010 | Sathyanarayana et al. | |
| 2013/0056263 A1 | 3/2013 | Chavan et al. | |
| 2015/0136473 A1* | 5/2015 | Jafari | ............ H02G 3/0691 174/656 |

FOREIGN PATENT DOCUMENTS

WO  2013172879 A1  11/2013

* cited by examiner

*Primary Examiner* — Hoa C Nguyen
*Assistant Examiner* — Amol H Patel
(74) *Attorney, Agent, or Firm* — Lewis Roca Rothgerber Christie LLP

(57) ABSTRACT

The present invention is a connector for connecting two electrical cables having cladding to an aperture in an electrical panel. The assembled connector has a two piece spring, a shell, and a insulator along a longitudinal axis. Each spring has a base from which an insertion tab extends coaxial with the axis and the insulator has two curved portions to prevent over-insertion of the cladding into the connector. The insertion tabs of the spring have hook latches and the insulator has a wall to prevent the electrical cables from interfering with the hook latches. The insulator also has a pressure prong for applying a radial grounding force to the connector.

19 Claims, 5 Drawing Sheets

RELEASABLE ELECTRICAL CONNECTOR

BACKGROUND OF THE INVENTION

Technical Field

The present invention relates generally to connectors for connecting electrical cables and flexible conduits to electrical panels, and more particularly to an improved connector that allows easier insertion of the connector into the panel, the attachment of multiple cables within a single connector and the precise positioning of the conduits of the cables within the connector.

Background Art

The present invention relates to connectors for connecting electrical cables having flexible conduits to electrical panels. The invention is an improved connector that allows easier insertion of multiple electrical cables into a trailing end of the connector and the connector into the electrical panel, and providing precise positioning of the flexible conduits within the connector so that the conductors of the cables can easily pass through the connector into the panel.

Historically, armored cable (AC) or metal-clad cable (MC) has been connected to a panel by a tubular connector including a leading end having a threaded nose and a trailing end having a lateral screw mounted laterally through the connector wall or a set of strap screws attached to the trailing end. The threaded nose was inserted into an aperture in the panel and a locknut tightened thereon to secure the connector to the panel. A single AC or MC cable was then inserted into the trailing end and the lateral screw or the strap screws were tightened to secure the cable to the connector. It is important to secure grounding and since the connector is made out of metallic material it creates a good electrical continuity (grounding) between the electrical panel and the cable.

Typically in electrically wiring a construction project, whether it is a building or factory, requires electrical contractors to make hundreds to thousands of such connections. Moreover, such installation necessitates using tools to achieve a secure connection, including a wrench on the lock nut and a screwdriver on the laterally mounted screw. Therefore, it should be appreciated that completing all of these connections can be very time consuming, when contractors usually use such mentioned tools on each connection. In addition, since only a single cable could be attached to the connector, in certain applications an electrical panel needed to be extremely large to accommodate all the connectors.

Recently several types of snap engagement connectors have been introduced as a means of connecting cables to electrical junction boxes in order to reduce the time and effort required for installation of connectors in electrical wiring. Although using the aforementioned snap engagement connectors eliminates using tools for installation, they typically require a lot of effort to snap them on the junction box. Furthermore, if there is a need for a retrofit or disconnection of the connector, the contractors have no choice but using a tool to remove the snap engagement connectors and that in turns involves a lot of effort and force. In addition, such connectors were difficult to operate due to the cladding interfering with the snap mechanism and did not allow the conductors of the cable to easily pass through the connector.

Therefore, what is needed is a connector for securing multiple electrical cables to the junction box and the type that does not require the use of any tools for installing or removal, at either the leading or trailing end, and that allows the leading end to connect quickly and securely to the electrical junction box and the cable to be securely fitted into the trailing end. Such a connector would vastly reduce the time and effort involved for installing or removing electrical cables in a structure wiring. The desired connectors must be additionally designed to work with standard electrical panels, boxes, housings, etc., while allowing quick and easy connection with standard size knockout apertures and be designed to operate efficiently without interference by the cladding.

BRIEF SUMMARY OF THE INVENTION

Accordingly, the present invention is an improved connector for connection of multiple electrical cables having flexible conduit to electrical junction boxes and panels.

An embodiment of the present invention is a connector for connecting two electrical cables to an aperture in an electrical panel. The connector includes two separate springs, a shell, and an insulator that collectively have a longitudinal central axis when the connector is assembled. Each spring has a U-shaped base from which an insertion tab extends parallel to the longitudinal central axis. Two flexible support tabs are positioned on either of the insertion tab which together with the insertion tab form the U-shaped spring. The two springs are positioned within the shell side by side in mirror fashion. The support tabs, insertion tab and the base form the U-shaped profile conforming to the interior configuration of the shell. It is to be understood that the connector components could also have other shaped profiles. The two side support tabs and the base of each spring each have a prong bent inward with jugged-in sections and free end tips for engaging the cladding. The shell has an internal wall located within the shell to engage an end of the support tabs of the springs to form a closed end to the U-shape for receipt of the cable.

The insertion tabs are bent to form spring sections. The spring sections pop out of side openings in the shell to press and release the spring inside and out of the aperture hole of the panel. The insertion tabs have free end tips and each tip has two side extensions bent at an angle to form hook latches. The resilient insertion tabs push the hook latches against the inner wall of the panel. When the connector is pushed through the panel aperture, the hook latches slide over the edge of the opening against spring force of the insertion tabs and the latches snap into the aperture such that the side sections abut the panel around the aperture. The hook latches are directed away from the axis to extend into the aperture and snappingly lock the connector in the aperture.

The insulator has side walls extending into the shell and positioned directly behind each of the spring sections of the insertion tabs to prevent interference from the conductors of the cable during operation of the hook latches during insertion and removal of the connector to the panel. The insulator has a pressure prong that is bent away from the axis with the free end tip toward the trailing end. The pressure prong pushes against the aperture in the panel and the resultant radial force provides better electrical conductivity and hence better grounding between the panel, shell, and spring. The insulator side walls also have a curved lower section that engages an end of the cladding of the cable to prevent over insertion into the connector.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which:

FIG. 2 is an isometric view of the electrical connector, junction box or panel, and cables of FIG. 1, wherein FIG. 2 shows these elements after connection.

DETAILED DESCRIPTION OF THE DRAWINGS

Figure 1:
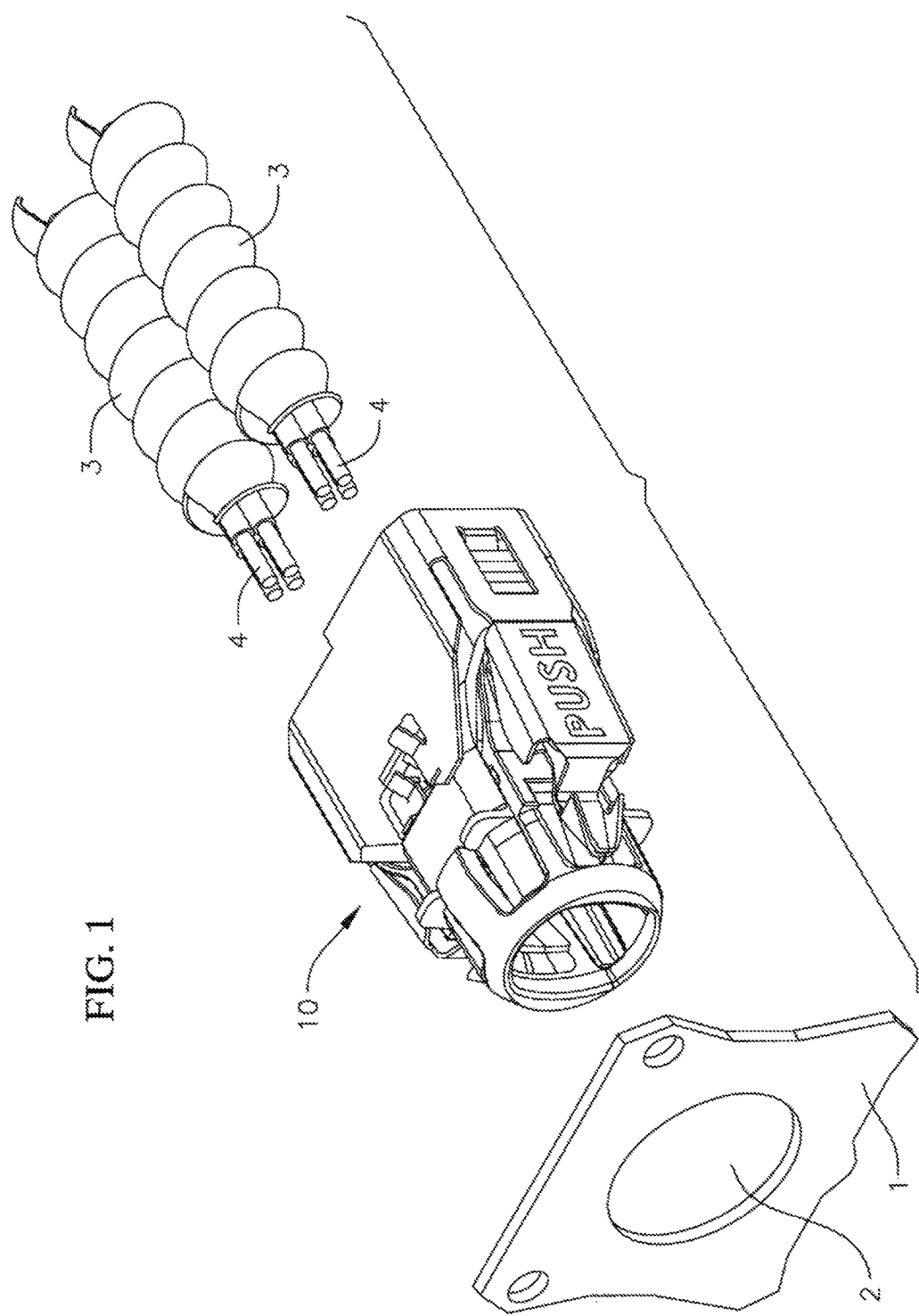
FIG. 1 is an isometric view of an exemplary embodiment of an electrical connector according to the present invention that is aligned with a junction box or panel at a knock out hole or aperture and also aligned with two electrical cables prior to connection.
Figure 2:
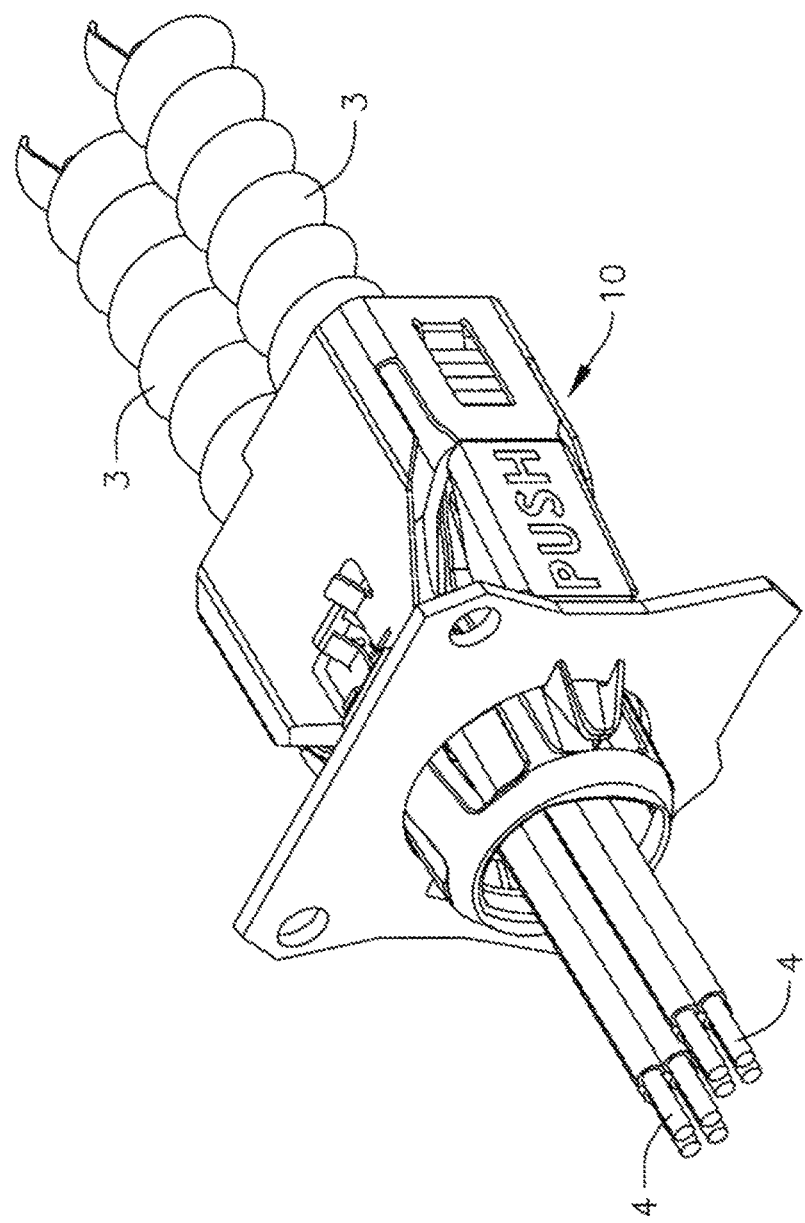

An embodiment of the present invention is an electrical connector 10 as illustrated in FIGS. 1-4. FIG. 1 is an isometric view of the connector 10 aligned with a knock out hole or aperture 2 in an electrical panel 1 and with two electrical cables 3 prior to connection. FIG. 2 is an isometric view of the connector 10 after connection. As can be seen in these figures, the connector 10 secures into the aperture 2 of the panel 1 and securely receives the cables 3. In practice, each cable 3 will support a plurality of electrical conductors or wires 4, which may be already present in the cables or installed through the cables later.

The transition from the pre-connection state in FIG. 1 to the post-connection state in FIG. 2 involves two operations. The cables 3 are pressed into locking engagement with the connector 10, and then the connector 10 is snapped into locking engagement in the aperture 2 of the panel 1. Alternately, the order of these operations can be reversed, snapping the connector 10 into the aperture 2 and then pressing the cables 3 into the connector 10. How the connector 10 facilitates these snap and press together operations is discussed in detail, presently. It is helpful, however, to appreciate now and throughout this discussion that these operations are manual, here meaning that they can be performed entirely by hand and without any tools. The snap and press insertions here are also essentially linear operations, that is, not requiring any rotational screwing or locking together of pieces to employ the connector 10.

Figure 3:
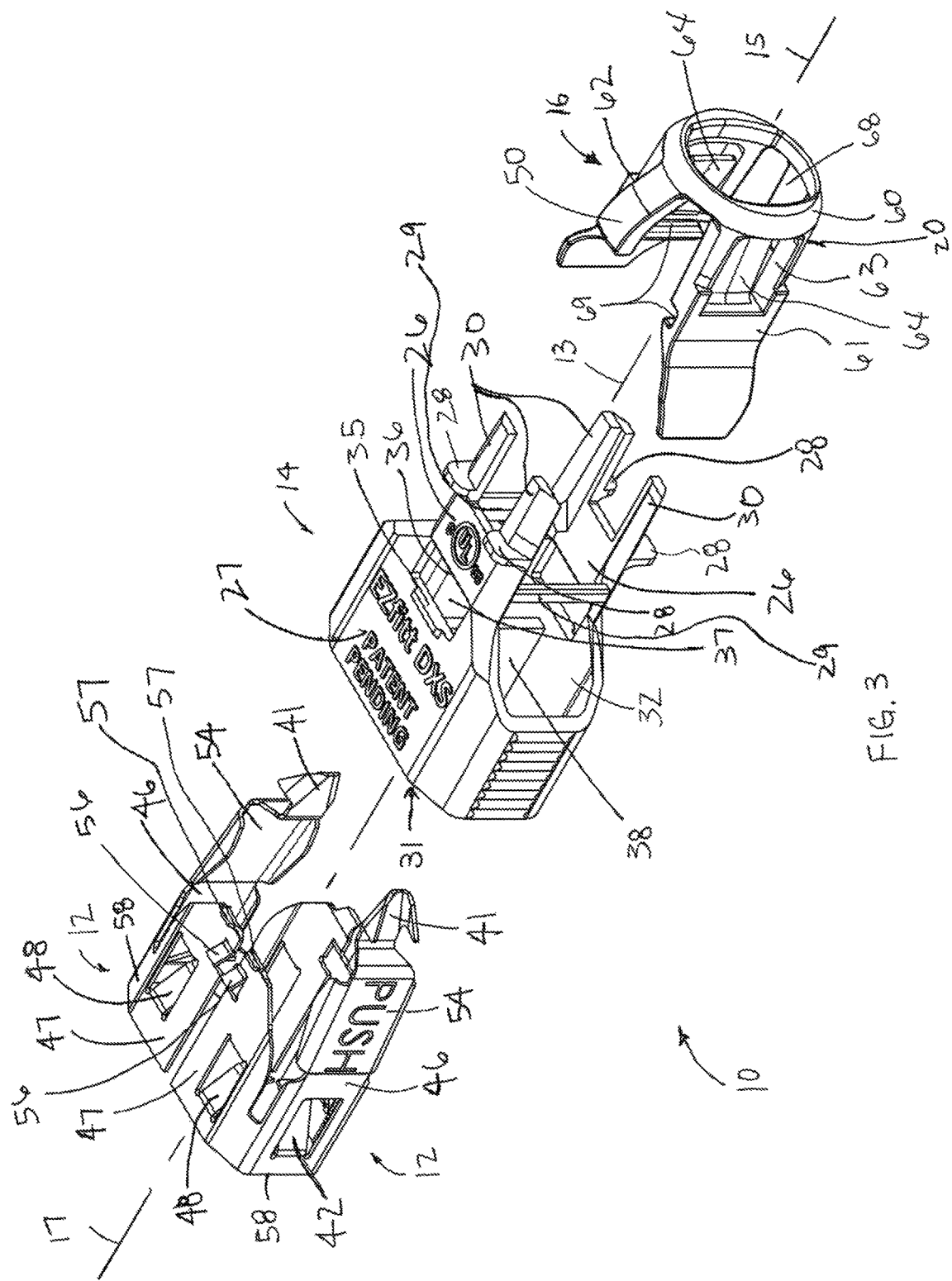
FIG. 3 is an exploded isometric view of the connector of FIG. 1.
Figure 4:
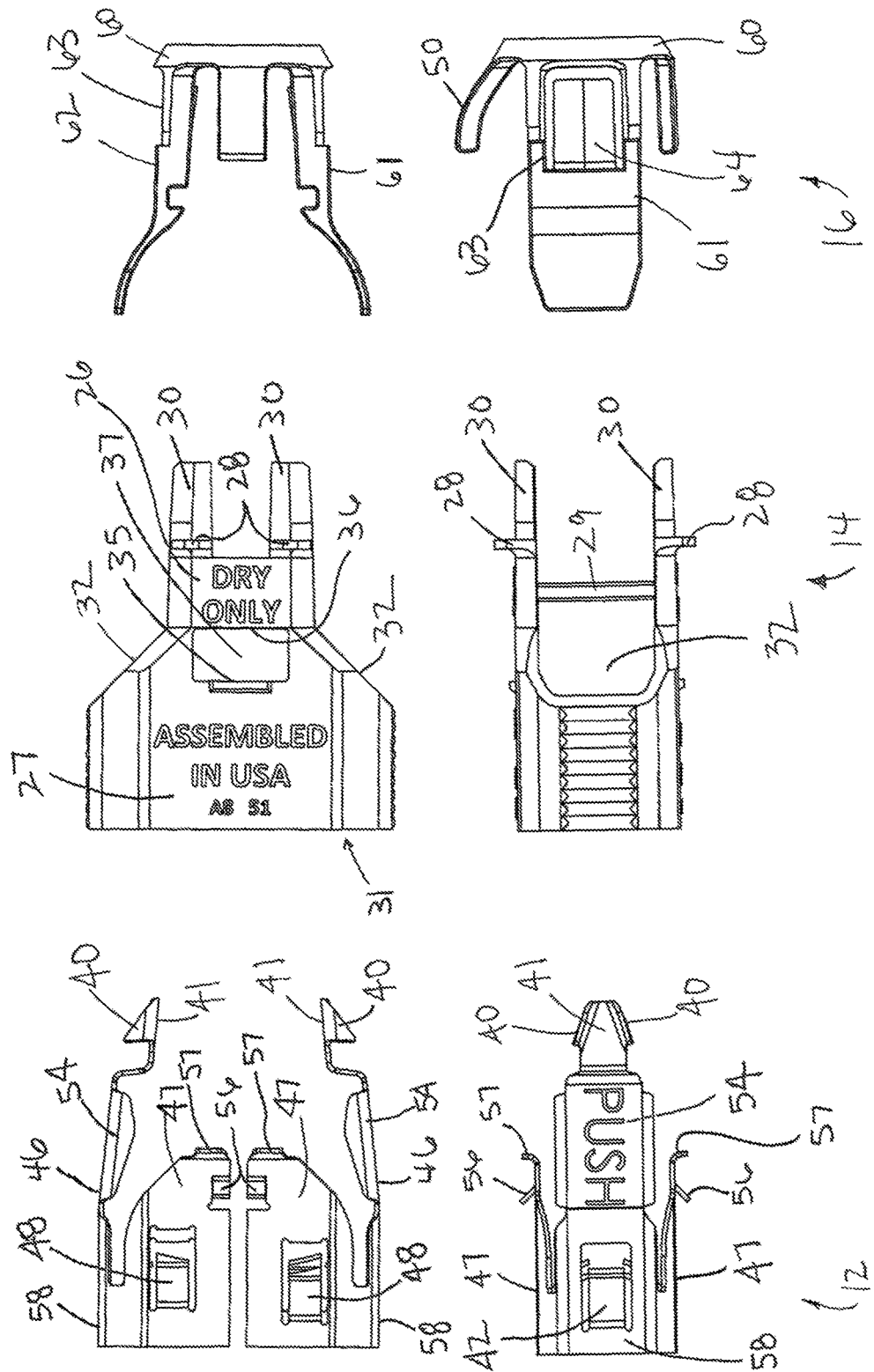
FIG. 4 is an exploded top view, shown on the top of the Figure and an exploded side view, shown on bottom of the Figure, of the connector of FIG. 3.
Figure 5:
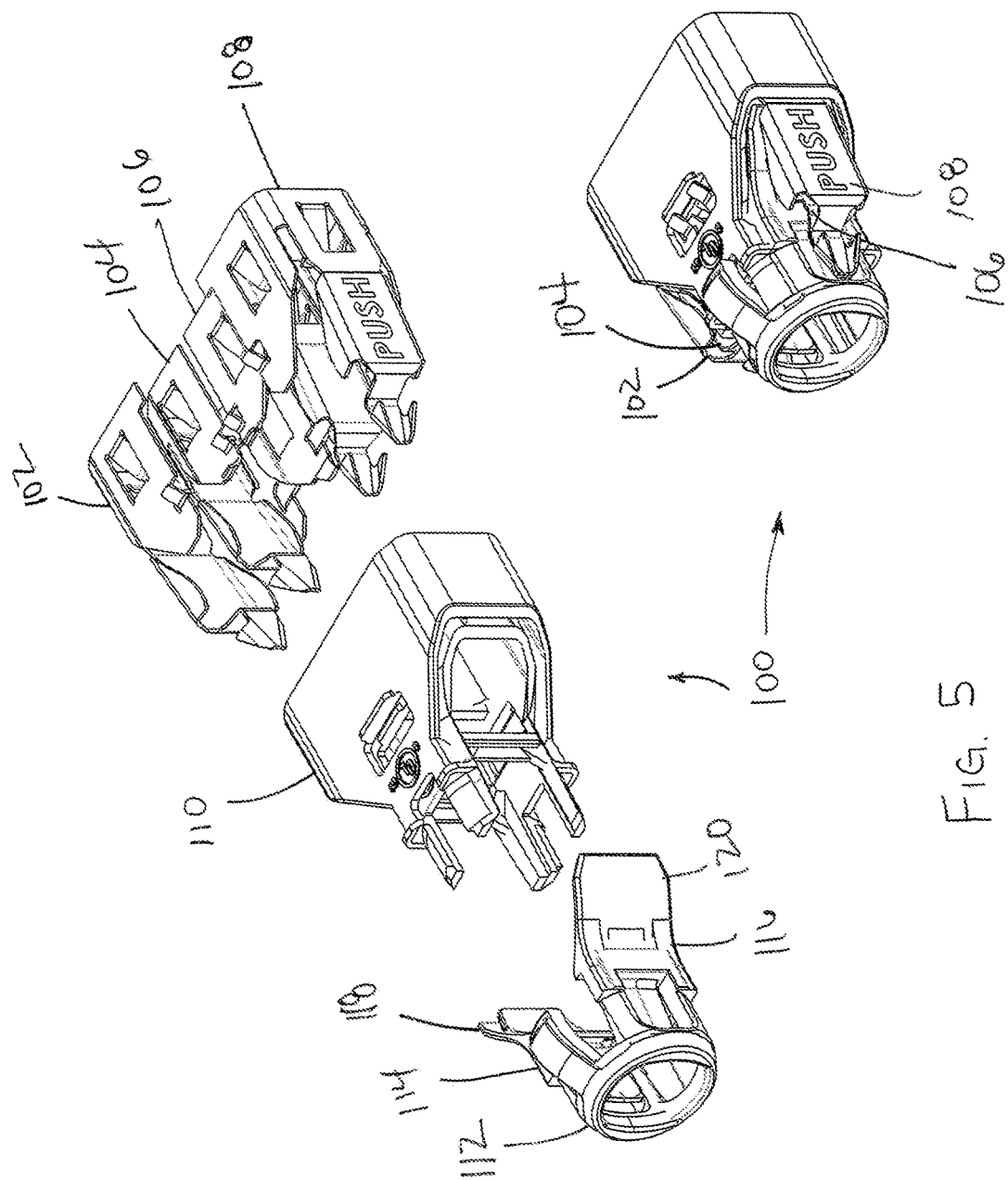
FIG. 5 is an exploded and assembled isometric view of an alternate embodiment connector.

FIG. 3 is an exploded isometric view of the connector 10. As shown, the connector 10 comprises two springs 12, a shell 14, and an insulator 16. Collectively these components have a longitudinal axis 13, as shown.

Each spring 12 is preferably made of die-stamped and formed metal (e.g., from galvanized steel sheet), the shell 14 is made of molded plastic (polycarbonate) or cast metal (e.g., aluminum, zinc, or pots metal), and the insulator 16 is made of molded plastic (e.g., polycarbonate), although neither these particular materials or these manners of forming them are requirements.

Each spring 12 is resilient and electrically conducting, and has a base 58 that extends to form an insertion tab 46. Two support tabs 47 are positioned on either side of the base 58. The insertion tab, support tabs and base form a U-shaped profile conforming to an interior configuration of the shell. Each insertion tab 46 has one or more gripping prongs 42 bent inward with jugged-in sections and free end tips. Each support tab 47 also has a similar gripping prong 48 with a free end tip bent at an angle towards the central axis 13. The insertion tabs 46 are bent to form spring buttons 54. The spring buttons pop out of the shell side openings 32 to press and release each spring 12 inside and out of the aperture hole 2.

Although springs 12 are shown as two separate components, it is to be understood that they could be a single component having two insertion tabs. The insertion tabs have free end tips 41 and each tip has two side extensions barbs 40 bent at an angle to form hook latches. The resilient insertion tabs push the extension barbs 40 against the inner wall of the panel 1. When the connector is pushed through the panel aperture 2, the extension barbs 40 slide over the edge of opening against spring force of the insertion tabs 46. When they pass the over the edge of aperture 2, the spring force pushes and the insertion barbs snap into the aperture such that the extension barbs abut the panel around the aperture 2. The extension barbs 40 are directed away from the axis to extend over the inside surface of the panel 1 and snappingly lock the connector 10 in the aperture 2.

The base 58, the insertion tab 46 and the support tabs for each spring nominally conform to the inner shape of the shell 14 to permit insertion of cables 3. The base 58 is at a defined trailing end 17 of the connector 10, thus also defining an opposite leading end 15 of the connector 10.

The two insertion tabs 46 can be the same in general shape and are mirror images of one another when positioned in the shell. Each extends, as shown, from opposite sides of the connector around the longitudinal axis. The insertion tabs 46 have a extruded section that forms the spring button 54, described presently. The insertion tabs 46 are further each extended to form the respective free end tips 41. The free end tips 41 have the two angled barbs 40 on the side of the free end tip, as shown. As also shown, the barbs 40 can optionally have a triangular or curved cutout between adjacent pairs to permit better grip on the inner wall of a panel 1. The corners of barbs 40 can also operate to penetrate through a paint or oxidation layer on the inner wall of the panel, to reach an underlying metal wall material of the panel 1 and thus provide better electrical conductivity and grounding.

Each support tab 47 has two locking tabs 56 and 57 bend outward to secure the spring inside the shell and preventing it from pulling out. Each insertion tab 46 provides a base from which one or more prongs extend inwardly at an angle less than 90 degree to form side gripping prongs 42. The two gripping prongs 42 can also have the same shape, but preferably there are minor differences to facilitate better engagement with the spiral or helix shaped sides of a cable 3. An inward bent prong from support tabs 47 also forms a gripping prong 48. The respective prongs in each of these sets can also be the same in size and degree of inward bend, but can be slightly different and are not axially aligned to facilitate better engagement with the spiral or helix shaped sides of the cladding of cable 3, and thus better securing the cable 3 inside the connector 10, providing better electrical conductivity and grounding.

A second component of the connector 10 is the shell 14. It is rigid, typically also electrically conducting or not, and, as shown, it has a nominally oblong cross section. The shell 14 has a base 27, two support columns 26 extending upwardly on either side of the base which terminates in two spaced insulator supports 30 for each support column 26. Further the support columns 26 and insulator supports 30 have four perpendicular bosses 28 forming a base for the leading nose 20. Two opening windows 32 are positioned along the sides of this shell through which spring buttons 54 protrude out, and bridges 29 extend between support columns 26 to engage insulator 16. The two opening windows 32 are where the free end tips 41 and barbs 40 extend outwardly.

A third component of the connector 10 is the insulator 16. It has two guiding bodies 61 and 62 extending out of ring or base 60 having a circular or oval opening 68. The guiding bodies 61 and 62 slide into the shell and engage a lower inside surface portion of the insertion tabs 46 positioned in openings 32 of the shell 14. Guiding bodies 61 and 62 have openings 63 for passage of the hook latches of the insertion tabs. The lower curved portion of the guiding bodies extending into the shell provides a stop which engages an end of the cladding on cable 3 so that the cable is not over inserted into the shell and causes interference with operation of the insertion tabs. The guiding bodies 61 and 62 also have vertical wall 64 within openings 63 which provides a buffer between the hook latches and the wires 4 passing through the insulator. The insulator 16 has a pressure prong 50 extending from the base 60 that is bent away from the axis with a free end tip toward the trailing end. The pressure prong 50 engages the aperture and provides a radial force to securely ground the connector 10.

To assemble the embodiment of the connector 10 depicted in FIG. 3 the springs 12 are inserted in a first operation into the through opening 31 in the trailing end on either side of the septum wall 38 inside of the shell 14 and then the insulator 16 is inserted into the shell 14 from the leading end so that the guiding bodies 61 engage the inside surface of the insertion tabs. The guide bodies have channels 69 which engage the bridges 29 of shell 14. The first insertion operation includes inwardly displacing the locking tabs 56 of the support tabs 47 sufficiently to permit passage and engagement with lower edge 35 of the opening 37 of the shell 14. At the same time, the locking tab 57 engages upper ledge 36 of opening 37 of shell 14. A final press slides the spring 12 tightly inside shell 14. Once the springs 12 are brought to its final position in the shell 14, the locking tabs 56 and 57 snap out of openings 37 on shell 14 fitting spring 12 firmly inside shell 14 securing strong electrical conductivity and grounding between spring 12 and shell 14. Once the spring 12 is brought to its final position in the shell 14, the two spring buttons 54 extend out of openings 32 and the insertion tabs spring back displacement constrains free end tips 41 on each insertion tab 46 against side walls 21, thus trapping the spring 12 in the shell 14. In this manner the pressure buttons 65 and spring buttons 54 are used as fit buttons during assembly (and can be used as release buttons for disassembly).

The second insertion operation includes snapping the insulator 16 into the sub-assembly of the shell 14 and spring 12. The insulator 16 is inserted by sliding the curved portions of the two guiding bodies 61 and 62 inside the insertion tabs with the channels 69 of the insulator 16 positioned over the bridges 29 of the shell 14, thus locking the insulator 16 within the sub-assembly of the shell 14 and the springs 12.

To connect the connector 10 to a panel 1, the spring buttons 54 are pressed which in turn presses the insertion tabs 46 inwardly moving the free end tips 41 and barbs 40 enough to pass the leading end 15 of the connector 10 into an aperture 2. When then released, the insertion tabs 46 bounce back, outward, to grip into the inner wall of the panel 1 through barbs 40.

To connect cables 3 to the connector 10, each cable 3 is pushed through the hole 31 at the trailing end 17 of the connector 10, until an end of the cladding of the cable 3 abuts against the curved portion of the guiding bodies of the insulator where it is then locked into place by the grip of the prongs (e.g., by the prongs 48 of support tabs 47, and prongs 42 of insertion tabs 46). The curved portion of the guiding bodies prevents the cladding of the cables from interfering with the operation of insertion tabs 46 and allow conductors (electrical wires 4) to freely pass through opening 68.

To disconnect the connector 10 from the panel 1, the spring buttons 54 of the insertion tabs are again pressed, thus inwardly moving and disengaging the free end tips 41, disengaging barbs 40 enough to remove the leading end 15 of the connector 10 from the aperture 2. To disconnect the connector 10 from the cables 3, the cables can be rotated counter-clockwise to unscrew the connector 10 from the cables 3 (since the prongs 42 and 48 are in screw-thread-like engagement with the spiral groove of the cable 3).

FIG. 3 is an isometric exploded and assembled view of an alternative embodiment connector 100 of the present invention. The connector 100 comprises four springs 102, 104, 106 and 108, a shell 110 and an insulator 112. Connector 100 is for applications for heavy duty or large diameter cladding electrical cable. Springs 104 and 106 are identical to springs 12 of connector 10 and are nested in outer springs 102 and 108 when assembled as shown. Having two springs on either side of the shell 110 provides for increased spring resistance necessary for larger electrical cable applications. Assembly and operation of connector 100 is similar to connector 10 other than nesting of springs 104 and 106 within springs 102 and 108 before insertion into the shell. The insulator 112 has guide bodies 114 and 116 which have curved sections 118 and 120 which when assembled are positioned on the inside surface of the insertion tabs of springs 104 and 106.

In summary, it can now be appreciated that the connecting and disconnecting of cables 3 to panel 1 with the connector 10 can be entirely manual, requiring little effort and no tools. The linear connecting operations of squeezing and inserting a connector into knock out hole or aperture and pressing a cable into the connector permitted by the present connector 10 should especially permit time savings during electrical construction. Similarly, to the extent rarely ever needed, the linear disconnecting operation of squeezing and withdrawing the present connector 10 from a knock out hole or aperture and the rotational disconnecting operation of unscrewing the present connector 10 from the cables will also permit time savings over the use of other types of connectors.

The present invention offers a quick connect connector for an electrical junction box or panel that requires no tools for connection or removal of the connector. Moreover, it needs much less effort and force for installation or removal compared to the existing snapping connectors.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A connector for connecting multiple electrical cables having cladding to an aperture in an electrical panel, comprising:
    a two piece spring positioned within a shell having a longitudinal central axis extending therethrough;
    each spring having a base from which an insertion tab extends around the longitudinal central axis wherein the insertion tab springingly moves within the shell;
    each insertion tab of said spring having latches extending outside of the shell to snappingly lock the connector in the panel when axially pressed into the aperture;
    the base of each spring further having an opening to receive a cable when axially pressed into the connector;
    each spring having a plurality support tabs each having a clamping tab to lock the cable in the connector by linear insertion and engagement of the cladding;
    the shell having a septum wall to divide the two piece spring; and
    an insulator having a wall to prevent the electrical cables from interfering with operation of the insertion tabs;
        wherein the insulator has guide bodies extending into the shell having an end portion which engages an end of the cladding of the electrical cables to prevent over insertion of the cables into the connector.

2. The connector of claim 1, wherein the two piece spring comprises four individual springs, wherein two of each four are nested together and positioned on either side of the shell.

3. The connector of claim 1, wherein the electrical cables have a spiral or helix shaped side and the clamping tabs are differently sized and not axially aligned to clamp against the spiral or helix shaped side of the cable.

4. The connector of claim 1, wherein the insulator includes a pressure prong to provide a radial grounding force for the connector.

5. The connector of claim 1, wherein the insulator wall for each insertion tab prevents interference from the electrical cables with the latches of the insertion tabs.

6. The connector of claim 1, wherein the support tabs have locking tabs to lock the spring to the shell.

7. A connector for connecting two electrical cables having cladding to an aperture in an electrical panel, comprising:
    a first spring and a second spring positioned within a shell having a longitudinal central axis extending therethrough;
    the first spring and the second spring having a base from which an insertion tab extends around the longitudinal central axis;
    the shell having side openings, wherein the insertion tab of the first spring and the second spring springingly extend out;
    each insertion tab having latches to snappingly lock the connector in the panel when axially pressed into the aperture; and
    an insulator positioned in the shell having a pressure prong to provide a radial grounding force for the connector to the electrical panel.

8. The connector of claim 7, wherein the first spring and the second spring are made of sheet metal.

9. The connector of claim 7, wherein the first spring and the second spring each comprise two spring member comprising an outer spring and an inner spring nested together.

10. The connector of claim 7, wherein the two electrical cables have a spiral or helix shaped cladding and the insertion tabs have a clamping tab to clamp against the spiral or helix shaped cladding of the cable.

11. The connector of claim 7, wherein the insulator further has a wall to prevent the electrical cables from interfering with operation of the two side insertion tabs.

12. The connector of claim 11, wherein there is a wall for each insertion tab to prevent interference by the electrical cables with the latches of the insertion tabs.

13. The connector of claim 7, wherein the insulator has guide bodies extending into the shell having an end portion which engages an end of the cladding to prevent over insertion of the electrical cables into the connector.

14. A connector for connecting two electrical cables having cladding to an aperture in an electrical panel comprising:
    a first spring and a second spring positioned within the first spring together positioned within one side of a shell;
    a third spring and a fourth spring positioned within the third spring together positioned within an opposite side of the shell;
    the first spring, the second spring, the third spring and the fourth spring having a base from which an insertion tab extends;
    the shell having side openings wherein the insertion tab of the first spring, second spring, third spring and fourth spring springingly extend;
    each insertion tab having latches to snappingly lock the connector in the panel when axially pressed into the aperture; and
    an insulator positioned within the shell having an end portion engaging an inside surface the second spring and the fourth spring.

15. The connector of claim 14 wherein the first spring, the second spring, the third spring and the fourth spring are made of sheet metal.

16. The connector of claim 14 wherein the two electrical cables have a spiral or helix shaped cladding and the insertion tabs have a clamping tab to clamp against the spiral or helix shaped cladding of the cable.

17. The connector of claim 14 wherein the insulator further has a wall to prevent the electrical cables from interfering with operation of the insertion tabs.

18. The connector of claim 14 wherein the insulator includes a pressure prong to provide a radial grounding force for the connector.

19. The connector of claim 14 wherein the insulator has guide bodies extending into the shell having an end portion which engages an end of the cladding to prevent over insertion of the electrical cables into the connector.

* * * * *